Dec. 16, 1952 R. BAUERLE ET AL 2,621,813
VIBRATING CAR UNLOADING DEVICE
Filed Feb. 23, 1950 5 Sheets-Sheet 2
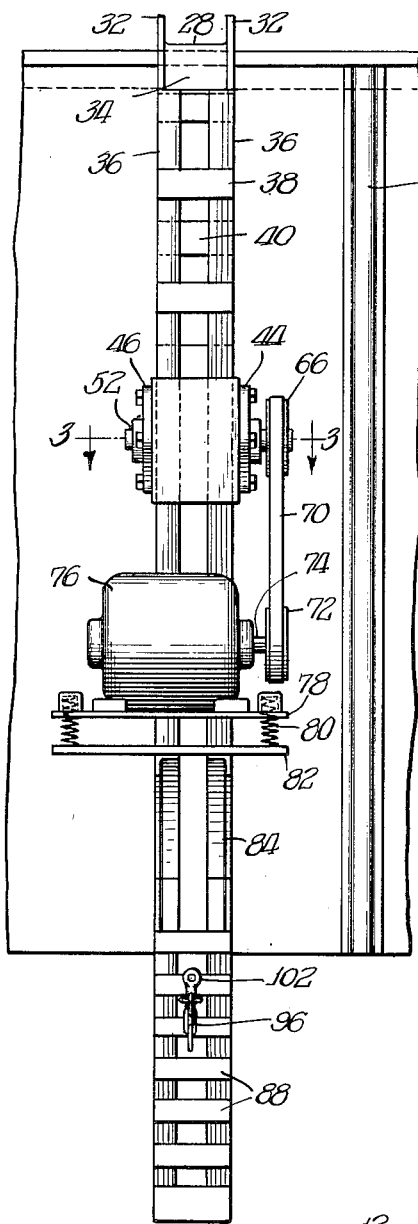
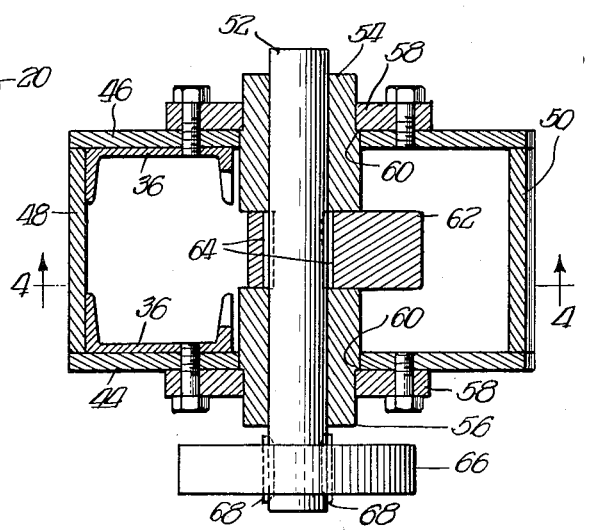
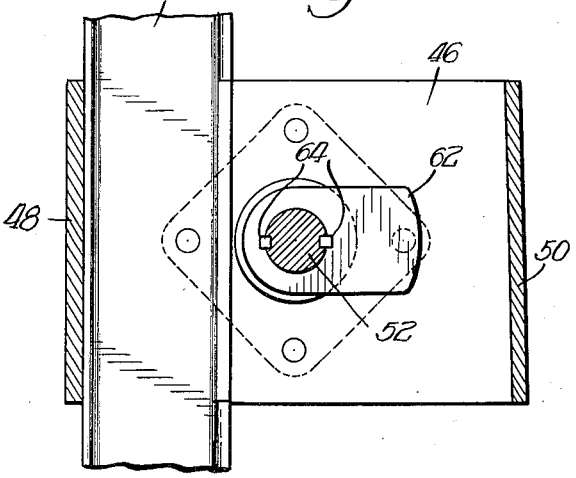
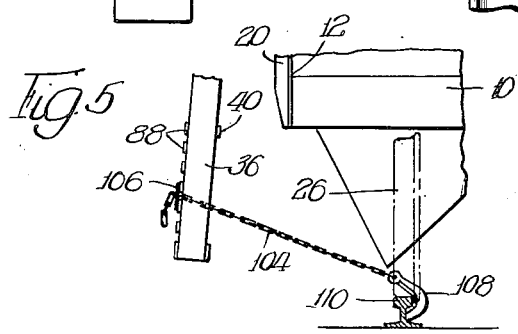
INVENTORS.
Robert Bauerle,
BY Richard Lee Wagner,
Wilkinson, Huxley,
Byron & Hume attys.

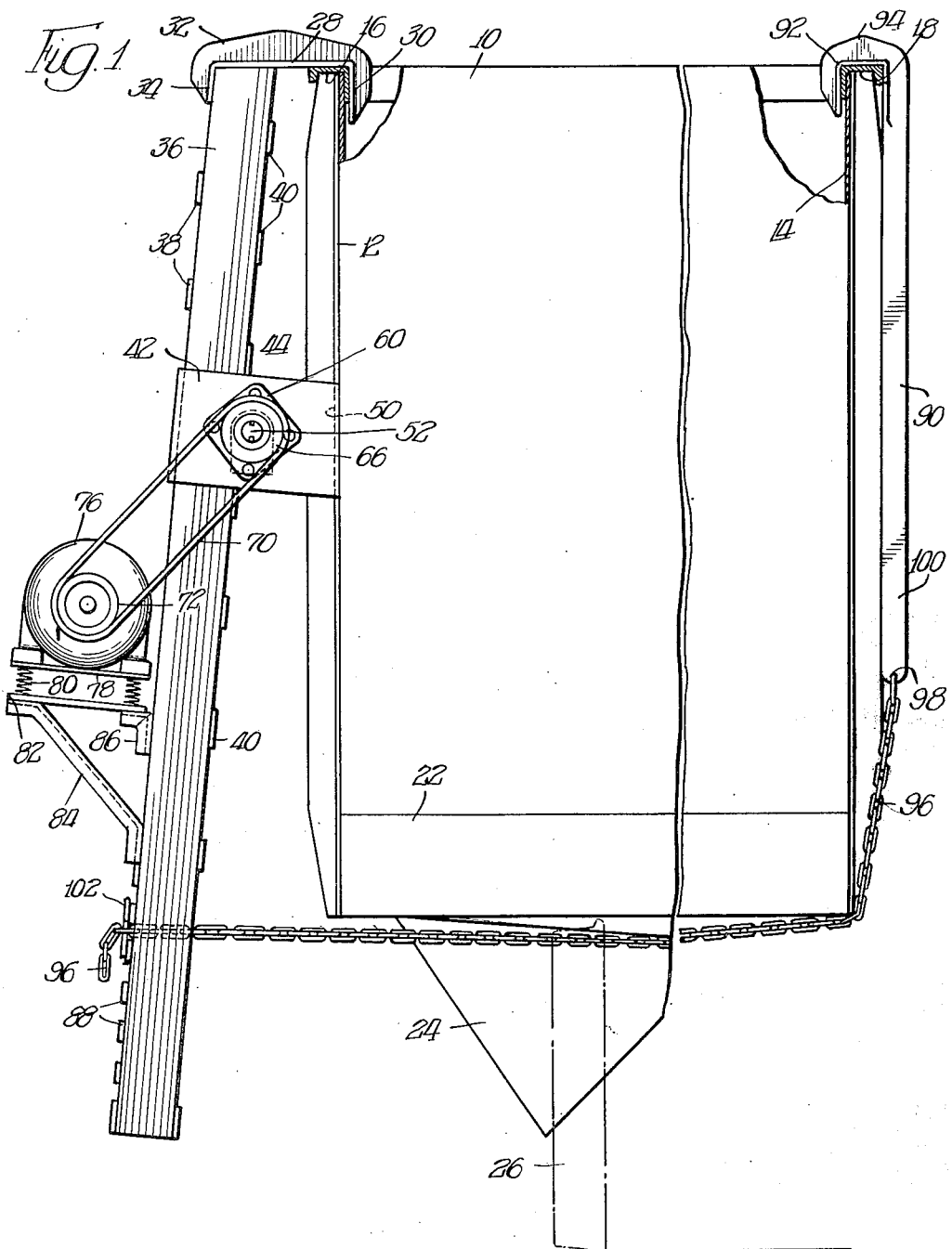

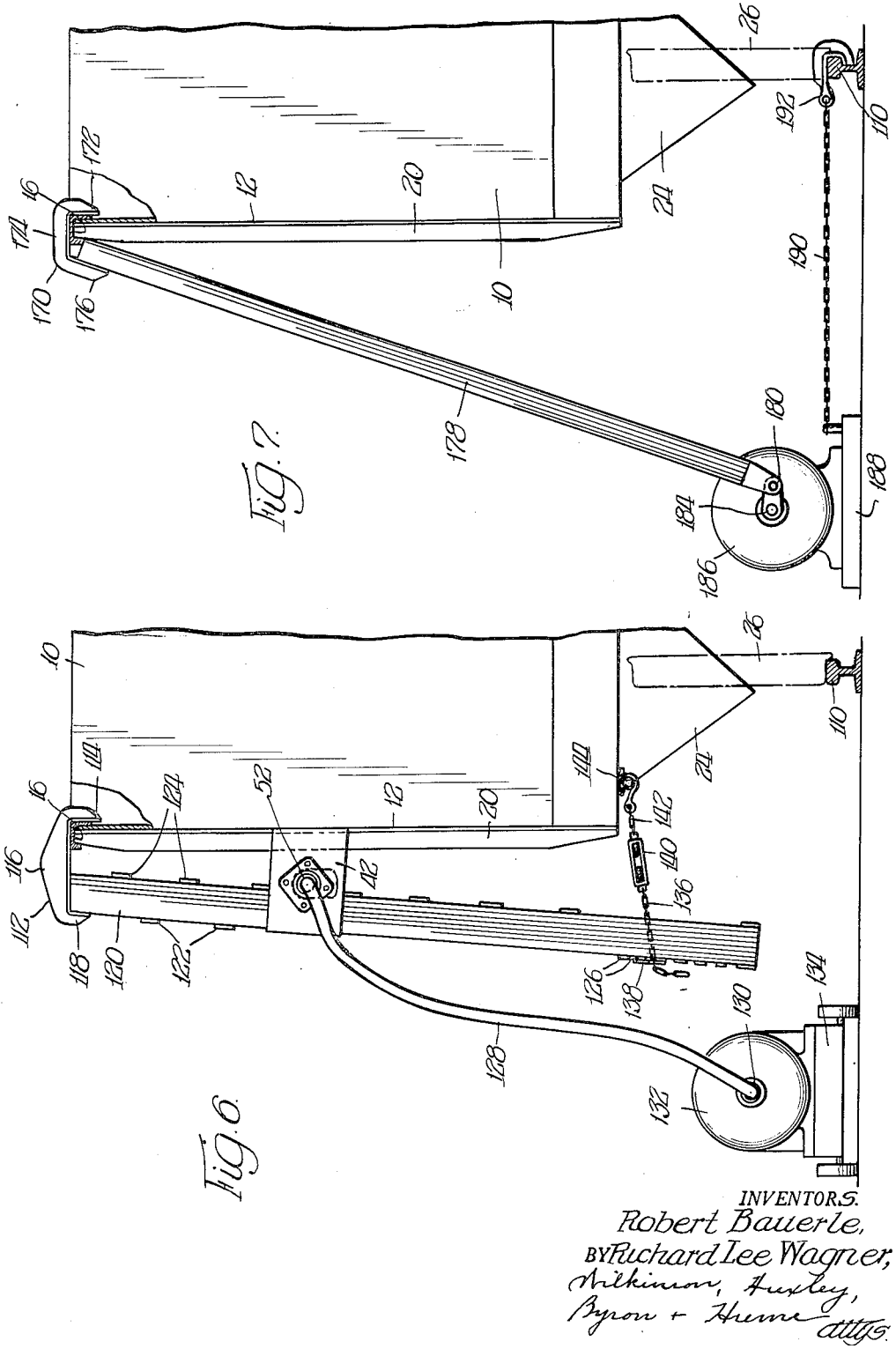

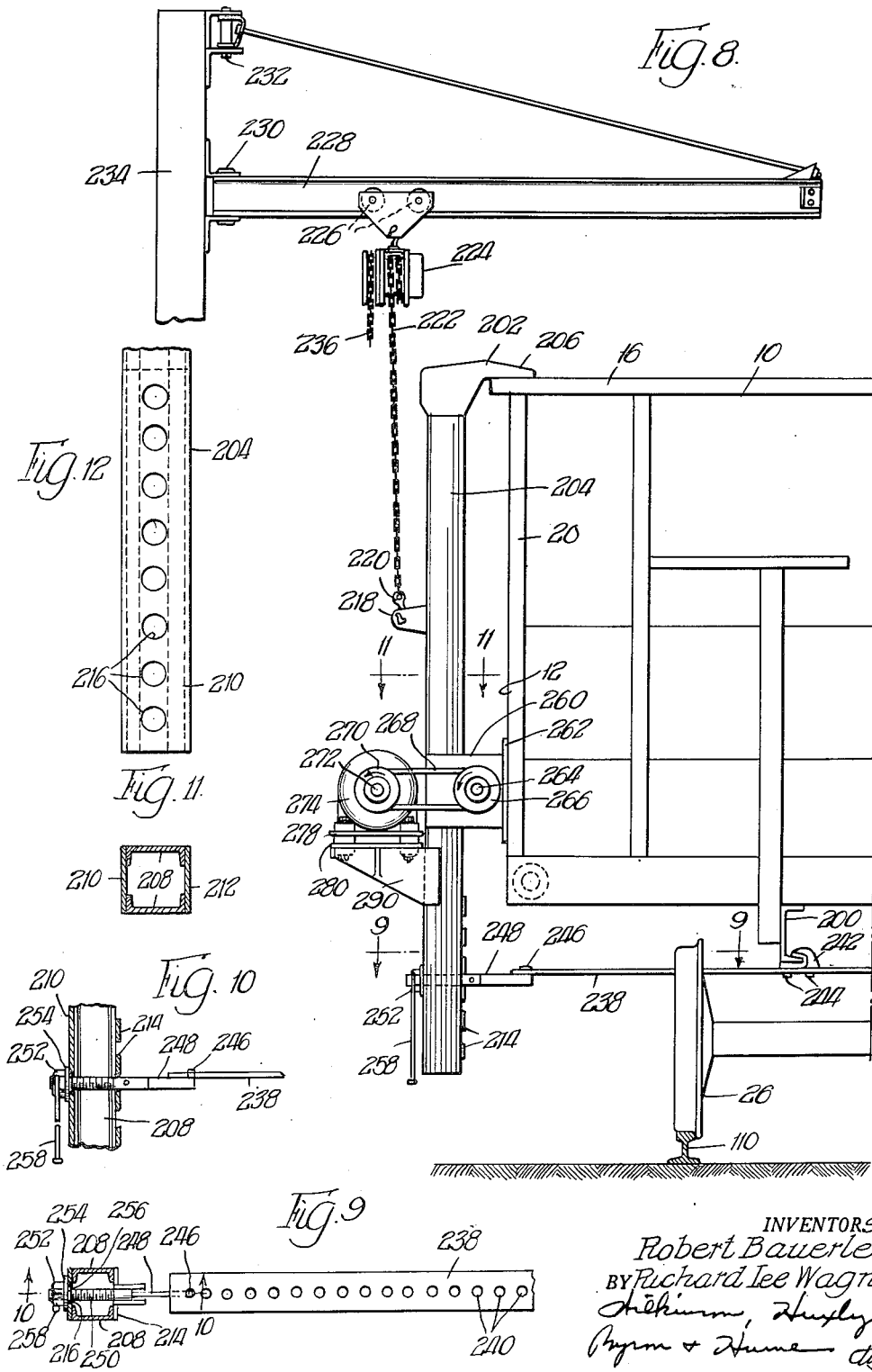

Dec. 16, 1952     R. BAUERLE ET AL     2,621,813
VIBRATING CAR UNLOADING DEVICE
Filed Feb. 23, 1950     5 Sheets-Sheet 5
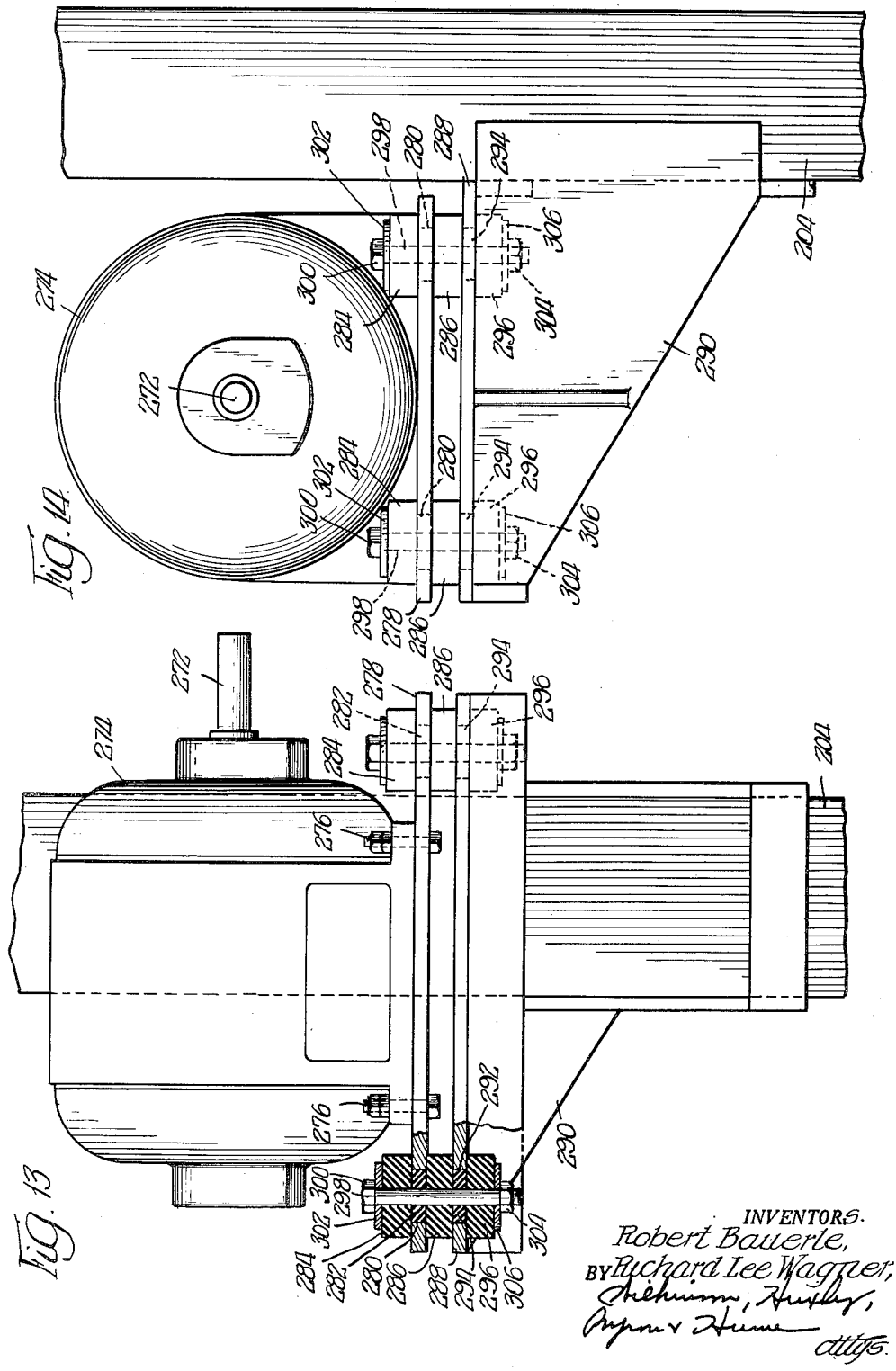

Patented Dec. 16, 1952

2,621,813

UNITED STATES PATENT OFFICE 2,621,813

VIBRATING CAR UNLOADING DEVICE

Robert Bauerle, Chicago, and Richard Lee Wagner, Evanston, Ill., assignors to Bauerle and Wagner, Chicago, Ill., a partnership Application February 23, 1950, Serial No. 145,831

4 Claims. (Cl. 214—83.3)

This invention pertains to a vibrating device for a vehicle, and, more particularly, to a vibrating device applicable to a railway car, road vehicle or the like, for accelerating the unloading of the contents of such vehicle.

There has long been a great need for some means to facilitate unloading vehicles, such as some means for starting and aiding the flow of comminuted material from a hopper vehicle. An illustration of the need is some means for starting and aiding the flow of coal, gravel, etc., from hopper, dump or drop bottom railway cars or motor vehicles.

In some cases, devices are used to bodily tilt the vehicle, but these are expensive and the vehicles must be disconnected from any other vehicles and can only be dumped over a limited area. In other cases impact devices are used, but these are objectionable as they are not readily portable, and tend to damage or destroy the vehicle.

It is therefore an object of this invention to provide a vibrating device for facilitating unloading of vehicles by bodily shaking the body to be unloaded.

Another object of the invention is to provide an unloading vibrating device for vehicles which is simple to apply and operate, is inexpensive to manufacture and maintain, yet is effective and serves to easily and speedily start and aid the flow of the substance to be unloaded or discharged from a vehicle or other container.

Another object of the invention is to provide a controllable vibrating or agitating device which when applied to a vehicle (or other container) to be emptied, will bodily shake such vehicle with substantially no application of damaging impact thereto.

Another object of the invention is to provide an unloading vibrating device for vehicles which is readily portable and can be used without the necessity of moving the vehicle to be unloaded or of disconnecting it from any other vehicle to which it may be coupled.

With these and various other objects in view, the invention consists of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary, transverse sectional elevation through a hopper car showing the vibrating device applied thereto;

Figure 2 is a fragmentary, side elevation of the car illustrated in Figure 1 showing the vibrating device applied thereto, the same looking toward the right as viewed in Figure 1;

Figure 3 is an enlarged, sectional, top plan view through the vibrating unit of the vibrating device shown in Figures 1 and 2, the same being taken substantially in the plane as indicated by the line 3—3 of Figure 2;

Figure 4 is a fragmentary sectional elevation taken substantially in the plane as indicated by the line 4—4 of Figure 3;

Figure 5 is a fragmentary, transverse sectional elevation showing the vibrating device illustrated in Figure 2 held in fixed position with respect to a vehicle by different means than shown in Figure 1;

Figure 6 is a fragmentary, transverse sectional elevation through a hopper car, showing another modified form of vibrating device applied thereto;

Figure 7 is a fragmentary, transverse sectional elevation through a hopper car, showing still another modified form of vibrating device applied thereto;

Figure 8 is a fragmentary, transverse sectional elevation through a hopper car, showing another modified form of vibrating device applied thereto, and also showing means for applying said device to the car;

Figure 9 is a fragmentary, sectional plan view of a portion of the support for the vibrating mechanism, and showing the tie member for securing the device to a car, the section being taken substantially in the plane as indicated by the line 9—9 of Figure 8;

Figure 10 is an enlarged sectional elevation through the support shown in Figure 9, the same being taken substantially in the plane as indicated by the line 10—10 of Figure 9;

Figure 11 is a sectional plan view taken substantially in the plane as indicated by the line 11—11 of Figure 8;

Figure 12 is a fragmentary, side elevation of the lower part of the support of the device illustrated in Figure 8, the same looking toward the right as viewed in Figure 8;

Figure 13 is an enlarged side elevation of a form of motor mounting embodying the invention; and, Figure 14 is an elevation of the motor mounting shown in Figure 13, the same looking toward the left as viewed in Figure 13.

This application is a continuation-in-part of application Serial No. 6,983, filed February 7, 1948, now abandoned.

While the device is shown as applied to a railway hopper car, it is, of course, understood that it may be applied to any other type of vehicle or container where agitation is desirable or necessary for the moving or removal of the contents therein or therefrom.

The vehicle 10 includes the side frames which comprise the side sheets 12 and 14, connected by suitable car ends, said sheets having the top or belt rails 16 and 18, the sides being re-enforced by means of the vertically disposed stakes or posts 20, the side frames being also connected by the transversely extending bottom members 22. The contents of the car is adapted to be dispensed through hoppers 24, and the car is supported by the usual wheels 26 through suitable trucks (not shown). Where a vehicle such as a hopper car carries coal, particularly finely divided coal, it is very difficult to unload said coal, as it becomes tightly packed. Various means are resorted to, to move it for discharge through the hoppers and in the present instance a vibrating device is utilized embodying the invention.

The vibrating device consists essentially of a top inverted U-shaped rail engaging supporting member 28 provided with the inner leg 30 adapted to embrace and engage the rail member 16, the U-shaped member 28 being provided with brace or strengthening members 32. The outer leg 34 of the rail engaging member 28 is secured to the spaced, depending support members 36 which preferably slope outwardly and downwardly from the car body when the device is in operative position as illustrated in Figure 1. The support members 36 preferably extend below the car body and are tied together by the spaced outer, upper transverse tie members 38 and the inner transverse tie members 40, said tie members preferably being staggered, one with respect to the other.

The eccentric vibrating unit 42 comprises spaced, side bracket members 44 and 46 secured to the support members 36 and are connected to each other outwardly of the support members 36 as by plate 48 which is also welded or otherwise secured to the support members. Said bracket members 44 and 46 extend inwardly or toward the car and are provided with the diagonally disposed plate 50 adapted to engage the adjacent side plate of the car, preferably over substantially the whole inner surface of the plate 50. Shaft 52 is journalled in bearings 54 and 56, positioned by retainer plates 58 through shoulders 60, said plates 58 being secured to the side plates 46 and 44. Eccentric weight 62 is keyed or otherwise secured to the shaft 52 as at 64 and shaft 52 is provided with pulley 66 keyed thereto as at 68. Belt 70 engages pulley 66 and pulley 72 fixedly provided on the driving shaft 74 of the motor 76.

While an electric motor is shown, it is of course understood that any other controllable source of power may be used. The motor is secured to base 78 resiliently supported as at 80 on the fixed support 82, the fixed support 82 being secured through brackets 84 and 86 to the supports 36.

Lower tie members or straps 88 are provided similar to tie members 38 but preferably disposed more closely together as they extend below the bottom of the car body and form adjustable securing means for fixedly positioning the vibrating device to the vehicle body. In the form of device shown in Figure 1, an elongated hook member 90 is provided with the upper jaw 92 adapted to embrace and be supported by rail member 18, said jaw being also suitably re-enforced as by ribs 94. A chain 96 is secured as at 98 to the lower end of the shank 100 of hook member 90 and is adapted to be passed under the car or vehicle body, drawn through spaced straps 88 in such a manner that plate 50 tightly and substantially immovably engages the side of the vehicle body and a removable securing member 102 is then passed through the adjacent link of the chain to maintain the vibrating device in assembled, tight relation to the vehicle.

In the form of device illustrated in Figure 5, the vibrating device is held tightly against the vehicle by providing chain 104, which is adapted to be secured between selected straps 88 by means of the removable securing means 106, the opposite end of the chain being provided with the hook member 108 which may either be hooked to the track rail 110 or to some member on the car body 10, such as a bottom sill or the like.

Operation of the motor 76 at a suitable speed causes rotation of shaft 52 at a suitable speed, in turn causing the eccentric weight 62 to rotate, setting up a non-impact vibration, thereby rocking the entire vehicle body on its wheels (trucks). The rocking of said car body causes loosening of the material contained within the body whereupon it flows freely out of the hopper 24.

By way of example, it has been found that using a 10# off weight eccentric weight 62, that a substantially 5 H. P. motor rotating at 1750 R. P. M. and having a pulley the same diameter as pulley 66, will adequately and easily shake a seventy ton capacity hopper car to quickly unload the contents thereof.

In the form of device illustrated in Figure 6 the vehicle 10 is similar to that shown in Figure 1 comprising the side sheet 12, opposite side sheets being connected by suitable car ends, said sheets having the top or belt rails 18, the sides being re-enforced by means of the vertically disposed stakes or posts 20. The contents of the car is adapted to be dispensed through hoppers 24, the car being supported by the usual wheels 26 engaging rails 110. As in the other modifications shown herein any type of vehicle is contemplated.

The vibrating device in this case consists of a top inverted U-shaped rail engaging member 112 (similar to member 28, Figure 1) being provided with the inner leg 114 (similar to leg 30) adapted to embrace and engage the rail member 16, the U-shaped member being provided with brace or strengthening members 116 (similar to members 32). The outer leg 118 (similar to leg 34) is secured to the spaced depending support members 120 (similar to members 36), which preferably slope downwardly and outwardly from the car body when the device is in operative position as shown in Figure 6. The support members 120 preferably extend below the car body and are tied together by the spaced, outer, upper, transverse tie members 122 (similar to tie members 38), by the inner transverse tie members 124 (similar to members 40), and by the lower, spaced, outer tie members 126 (similar to members 88). The eccentric vibrating unit 42 is carried by the support members 120 and is similar to that already described. In this case, however, the shaft 52 is adapted to be connected through a flexible shaft 128 to the motor shaft 130 of the motor 132.

While an electric motor is shown, it is of course understood that any source of energy may be used, either in this or other modifications. The motor in this case may be fixed adjacent the track, or may be mobile, being shown as mounted upon a suitable truck 134 adapted to be moved about as desired, but preferably adapted to be fixed when the vibrating device is in operation.

In order to fasten the support members 122, and consequently the vibrating unit 42, to the vehicle body, chain 96, fastening means 102 and hook means 90 may be used as illustrated in Figure 1, or the means may be used which embodies hook 108, chain 104 and securing means 106 as shown in Figure 5; or chain 136 may be utilized secured by member 138 (similar to member 102) and a turnbuckle 140 may be interposed between chain 136 and chain 142, the latter chain being provided with the hook 144. Said hook may be fastened either to a side sill of the vehicle body or to some other structural member, or to the track. It is, of course, understood that a turnbuckle may be used in either chain 96 or chain 104, if desired.

Operation of this device is similar to that described with respect to Figures 1 and 5, motor 132 being suitably operated to cause the vibrating device 42 to vibrate the vehicle the amount necessary to cause it to quickly flow out of the hopper 24.

Referring now to the modification illustrated in Figure 7, vehicle 10, similar to that already described, is shown provided with the side sheet 12, post 20 and top rail 16, hopper 24 being illustrated for ready removal of the contents of the car, the car being supported by wheel 26 on rail 110. The agitating device comprises the upper hook shaped member 170 having the inner leg 172 (similar to leg 30) which embraces the top rail 16. The member 170 is provided with the spaced re-enforcing members 174 (similar to members 32) and the outer leg 176 (similar to leg 34), the outer leg being secured to the depending, rigid reciprocating member 178. The lower end of said member 178 is pivotally connected as at 180 to the eccentric or crank 182 provided on the motor shaft 184 of motor 186. As before, while a motor is illustrated, any prime mover may be used. The eccentric crank is preferably relatively small, as it is only necessary to give a short rocking movement to the car body. The motor 186 is mounted on a movable base 188 mounted on suitable wheels or skids, not shown, but preferably adapted to be maintained immovable when the vehicle is being rocked. Any suitable anchoring means may be provided, one means being a chain 190 secured at one end of the motor base 188 and its other end to the rail 110 by means of the hook 192. As before, the chain may be provided with the turnbuckle, similar to turnbuckle 140 and in the operation of this device the car is rocked by the reciprocatory movement imparted to the body through the crank 182, reciprocatory member 178 and hook member 174. While a rigid member 178 is shown, a flexible member may be used.

Referring now to the modification illustrated in Figures 8 to 14, inclusive, vehicle 10, similar to that already described, is shown provided with the side sheet 12, post 20, and top rail 16, a hopper, not shown, being provided, if desired, for the ready removal of the contents of the car. The car is provided with the underframe, one of the longitudinal members or sills 200 being shown, and a wheel and axle being indicated at 26 engaging rail 110.

The agitating device comprises the upper, inverted, hook shaped member 202 secured to the depending support 204, member 202 comprising the inwardly projecting leg 206, whereby member 202 is adapted to embrace top rail 16 of car 10. Support 204 includes spaced channels 208 (Figure 11), connected on the outside by plate 210 disposed between the outer legs of said channels, the inner legs being connected part way down by plate 212, the lower part of said channels being connected by spaced straps 214, similar to straps 40. Outer plate 210 is provided with spaced apertures 216 disposed in alignment with the spaces between straps 214.

In order to position the agitating device in its operative supported position on car 10, brackets 218 are provided for receiving the hook 220 provided on the lifting chain 222 of the hoist 224, the hoist 224 being preferably movably supported as at 226 on the rail 228, said rail being pivoted as at 230 and 232 on the support 234 fixed adjacent the track rail 110. The hoist 224 is of well known construction, being provided with the operating chain 236 which is movable in one direction or another to lift or lower hook 220.

In order to fixedly secure the device in position on the car, plate or strap 238 is provided having spaced apertures 240 therein. A hook member 242 provided with spaced lugs 244 is adapted to be selectively positioned on strap 238, lugs 244 being so spaced that they are adapted to be received in adjacent spaced apertures 240. The outer end aperture is adapted to receive hook member 246 of the tension rod 248, said rod being threaded adjacent the end thereof as at 250 and extending through adjacent straps 214 and the aperture 216 aligned with the space between said straps.

Nut 252 provided with the washer 254 having a portion 256 extending into the adjacent aperture is disposed on the outside of said tension rod 248 and is provided with the operating rod 258 secured to nut 252 whereby the nut may be conveniently rotated to urge the support 204 in a counterclockwise direction as viewed in Figure 8 to a position tightly against the car, or to loosen the device for removal. Support 204 is provided with bracket members 260 connected by means of the plate or pad 262 adapted to engage the car side. Shaft 264 is journalled in the brackets 260 and is provided with the eccentric, similar to that provided at 62 in Figure 3, the eccentric being adapted to be rotated by means of the pulley 266 secured to shaft 264, the pulley being rotated by the belt 268 movable by a pulley 270 provided on the motor shaft 272 of motor 274.

Motor 274 is fixed as at 276 to plate 278 (Figures 8, 13 and 14). Plate 278 is apertured as at 280 (adjacent the four corners thereof) and a rubber washer 282 is disposed in each aperture, washer 282 being preferably slightly thicker than the thickness of plate 278. A rubber pad or block 284 is disposed above each washer 282 and a rubber pad or block 286 is disposed between plate 278 and plate 288, which is secured by a bracket 290 to supports 204. Plate 280 is also apertured as at 292, said apertures being in alignment with and similar to apertures 280 and also being provided with a rubber washer 294 similar to washer 282, being preferably slightly thicker than plate 288. Rubber block 296 is provided and securing means, such as the bolt 298, passes through apertures in rubber blocks 284, 286 and 296 and washers 282 and 294, the head 300 of said bolt engaging hardened washer 302 (such as metal) disposed on block 284 and the rotatable nut 304 engaging a similar hardened washer 306 engaging block 296.

The operation of this form of device is similar to that already described with respect to Figure 2. As before described, the device is lifted in place by means of hoist 224, hook 206 engaging the top rail 16 of car 10. Hook 242 is placed in position by inserting the lugs 244 in the selected apertures 240 of strap 238. Handle 258 is then rotated to tighten the tension assembly, positioning the plate 252 tightly against the side of the car. Motor 274 can then be operated to rotate pulleys 270 and 266, whereupon shaft 264 rotates the eccentric to cause agitation or shaking of the adjacent car.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

We claim:

1. In a device of the character described, the combination of spaced support members, a top inverted substantially U-shaped supporting member secured to said support members and adapted to engage the top of a side member of a vehicle body to be vibrated, whereby the support members are supported in depending position spaced from one side of the vehicle, a vibrating unit secured to said support members below said supporting member, said unit including spaced side bracket members secured to said support members, a shaft journalled in said bracket members, an eccentric weight fixed to said shaft, a pulley fixed to said shaft, said bracket members having a member disposed inwardly of said support members for engaging the adjacent side of the vehicle, a support fixed to said support members, a base resiliently supported on said fixed support, driving means mounted on said base and connected to said pulley whereby operation of said driving means rotates said eccentric weight, the lower end of said support members extending below the adjacent vehicle body and provided with spaced straps forming openings, a flexible member secured to said car body, and adjustable securing means for fastening said flexible member to said support members whereby said support members are fixed with respect to the vehicle body.

2. In a device of the character described, the combination of spaced support members, a top inverted substantially U-shaped supporting member secured to said support members and adapted to engage the top of a side member of a vehicle body to be vibrated, whereby the support members are supported in depending position spaced from one side of the vehicle, a vibrating unit secured to said support members below said supporting member, said unit including spaced side bracket members secured to said support members, a shaft journalled in said bracket members, an eccentric weight fixed to said shaft, a pulley fixed to said shaft, said bracket members having a member disposed inwardly of said support members for engaging the adjacent side of the vehicle, a support fixed to said support members, a base resiliently supported on said fixed support, driving means mounted on said base and connected to said pulley whereby operation of said driving means rotates said eccentric weight, the lower end of said support members extending below the adjacent vehicle body and provided with spaced straps forming openings, a tension member secured to said car body and extending through an opening, and adjustable securing means for fastening said tension member to said support members whereby said support members are fixed with respect to the vehicle body.

3. In a device of the character described, the combination of spaced support members, a top supporting member secured to said support members and adapted to engage the top of a side member of a vehicle body to be vibrated, whereby the support members are supported in depending position spaced from one side of the vehicle, a vibrating unit secured to said support members below said supporting member, said unit including spaced side bracket members secured to said support members, a shaft journalled in said bracket members, an eccentric weight fixed to said shaft, means for rotating said shaft and weight, and means for fixedly securing said support members to the vehicle body, said last named means including a rigid bar, a hook adjustable along said bar and releasably secured to the vehicle body underframe, and adjusting means for securing said last named member to said support members, said adjusting means extending through said support members and provided with an adjusting nut.

4. In a device of the character described, the combination of spaced support members, a top supporting member secured to said support members and adapted to engage the top of a side member of a vehicle body to be vibrated, whereby the support members are supported in depending position spaced from one side of the vehicle, a vibrating unit secured to said support members below said supporting member, said unit including spaced side bracket members secured to said support members, a shaft journalled in said bracket members, an eccentric weight fixed to said shaft, means for rotating said shaft and weight, and means for fixedly securing said support members to the vehicle body, a motor mounting for a motor to rotate said shaft, said motor mounting including a plate fixed to said support members, a plate on which the motor is fixed, resilient pads between said plates and above and below said plates, resilient washers disposed in apertures in said plates and aligned with pads above and below and between said plates, hardened washers disposed on the pads above and below said plates, and a securing bolt extending through each of said aligned hardened washers, pads and washers and having a head and nut bearing on said hardened washers.

ROBERT BAUERLE.
RICHARD LEE WAGNER.

REFERENCES CITED

The following references are of record in the file of this patent:

UNITED STATES PATENTS

| Number | Name | Date |
|---|---|---|
| 833,761 | Stevens | Oct. 23, 1906 |
| 1,090,510 | Williams | Mar. 17, 1914 |
| 1,774,896 | Miller | Sept. 2, 1930 |
| 1,932,520 | Horsch | Oct. 31, 1933 |
| 2,229,037 | Boldman | Jan. 21, 1941 |
| 2,471,849 | Wallace | May 31, 1949 |
| 2,507,749 | Bacheldor | May 16, 1950 |